(12) United States Patent
Renault

(10) Patent No.: US 6,813,547 B2
(45) Date of Patent: Nov. 2, 2004

(54) METHOD OF PROVIDING PROTECTION AGAINST THE EFFECTS OF SOLAR ORIGINATING PROTONS, SO AS TO MAKE IT POSSIBLE FOR A STAR SENSOR TO BE RECONFIGURED, AND AN ATTITUDE CONTROL SYSTEM IMPLEMENTING THE METHOD

(75) Inventor: Hervé Renault, Cannes (FR)

(73) Assignee: Alcatel, Paris (FR)

( * ) Notice: Subject to any disclaimer, the term of this patent is extended or adjusted under 35 U.S.C. 154(b) by 34 days.

(21) Appl. No.: 10/429,727

(22) Filed: May 6, 2003

(65) Prior Publication Data

US 2003/0216844 A1 Nov. 20, 2003

(30) Foreign Application Priority Data

May 16, 2002 (FR) ............................................ 02 06036

(51) Int. Cl.$^7$ ............................................... G01C 21/02
(52) U.S. Cl. ......................... 701/13; 701/222; 701/226; 244/158 R; 244/171
(58) Field of Search ........................... 701/13, 222, 226, 701/220, 214; 244/171, 158 R, 173, 164; 342/357.11, 357.14, 357.15

(56) References Cited

U.S. PATENT DOCUMENTS 6,102,338 A * 8/2000 Yoshikawa et al. ......... 244/171
6,142,423 A * 11/2000 Wehner ....................... 244/164
6,304,822 B1 10/2001 Liu et al.

FOREIGN PATENT DOCUMENTS

EP   0 554 808 A1   8/1993
EP   1 111 402 A1   6/2001

OTHER PUBLICATIONS

Flynn D J, Fowski W J, Kia T; "Flight Performance of TPOEX/POSEIDON Star Trackers" Proceedings of the SPIE vol. 1949, 1993, pp. 149–163, XP008013380, month is not available.

* cited by examiner

*Primary Examiner*—Tan Q. Nguyen
(74) *Attorney, Agent, or Firm*—Sughrue Mion, PLLC

(57) ABSTRACT

The invention provides a system and method of providing protection against the effects of protons of solar origin, so as to make it possible for a start sensor to be reconfigured. The system detects the arrival of an eruption of solar origin protons, supplies a control signal and triggering operation of the second star sensor in tracking mode on the basis of attitude data supplied by the first star sensor.

8 Claims, 1 Drawing Sheet

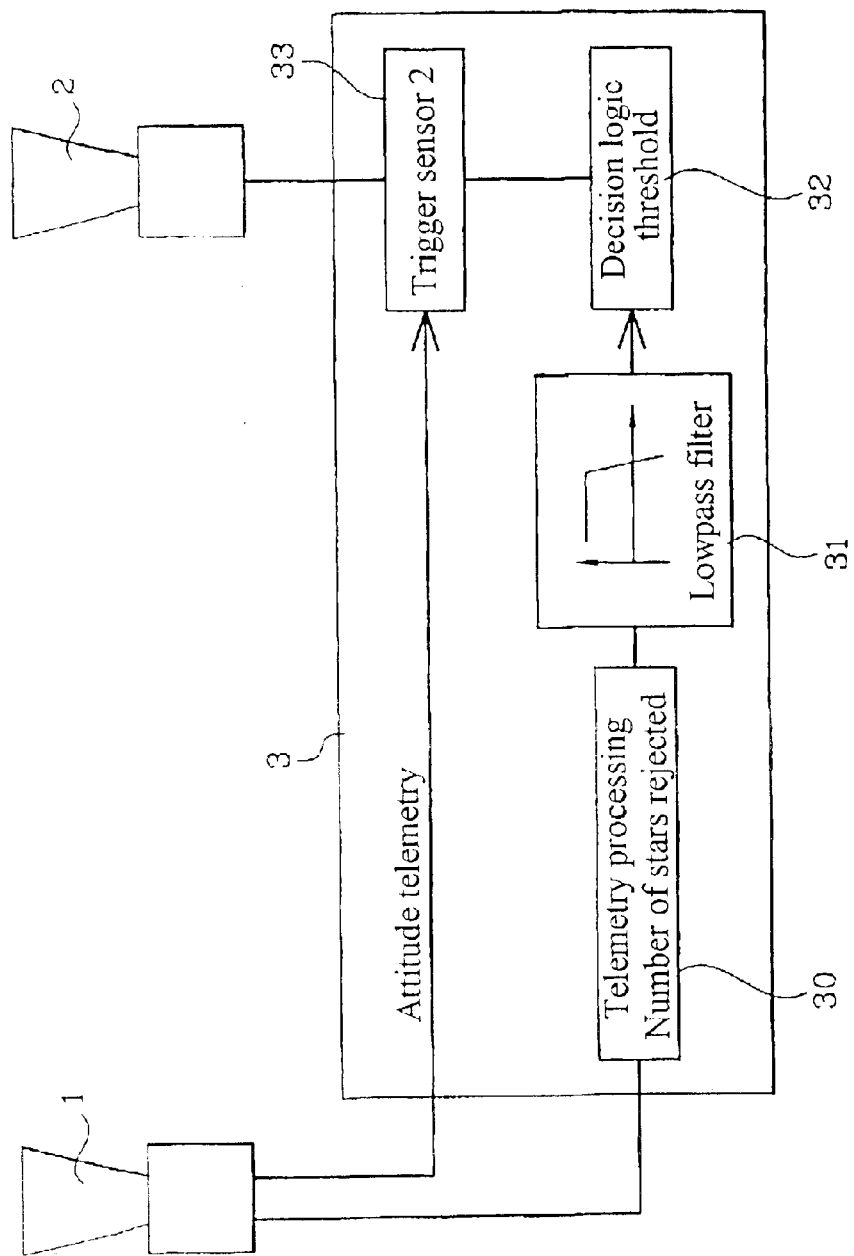
Sole figure

METHOD OF PROVIDING PROTECTION AGAINST THE EFFECTS OF SOLAR ORIGINATING PROTONS, SO AS TO MAKE IT POSSIBLE FOR A STAR SENSOR TO BE RECONFIGURED, AND AN ATTITUDE CONTROL SYSTEM IMPLEMENTING THE METHOD

The invention relates to a method of providing protection against the effects of solar originating protons, and to an attitude control system for a satellite implementing the method.

BACKGROUND OF THE INVENTION

It is necessary to know the attitude of a satellite in order to control maneuvers relating to the mission the satellite is to perform.

In known manner, the attitude of a satellite can be determined by means of a relationship between the three axes of the satellite and reference points such as celestial stars, and this can be implemented by means of a star sensor installed onboard the satellite.

The present invention relates more particularly to so-called "3-axis" sensors that are self-contained.

In order to perform a 3-axis measurement, such sensors need to process information from at least two stars. In practice, they process a larger number, typically five to ten. The principle of detecting proton flux is based on the fact that there are at least N stars used for determining attitude.

Star sensors conventionally use an array or matrix of charge-coupled device (CCD) detectors. They also comprise a lens system or "telescope" enabling an image to be obtained of a zone of space containing the star. Redundant equipment is generally provided to mitigate failures of the nominal equipment.

The field of view of a star sensor is determined by the dimensions of the array in the focal plane of the lens system. A system of coordinates can be given to the field of view or to the surface of the array of detectors, and the origin of this system of coordinates is preferably in the middle of the field of view. By knowing the positions of the stars seen relative to reference coordinates for the window of the sensor, and by correlating the resulting star "pattern" with a catalog of patterns, it is possible to obtain the attitude of the sensor, and thus of the satellite.

For better understanding of the invention, there follows an outline of the operation of a 3-axis sensor:

the sensor possesses one or more onboard star catalogs;

the sensor is characterized by two main modes of operation:

a) Acquisition mode: this mode enables the attitude of the sensor relative to an inertial frame of reference to be determined without a priori knowledge of said attitude. This initial determination is obtained by:

reading the entire CCD matrix;

determining the positions of candidate stars;

calculating the angular distances between pairs of candidate stars;

identifying candidate stars by comparing the calculated angular distances with an onboard catalog of pairs; and determining the 3-axis attitude as a function of the coordinates of the stars that have been identified.

b) Tracking mode: this mode makes it possible to calculate 3-axis attitude finely as a function of measuring the positions of stars in the field of view. This mode relies on a priori knowledge of attitude with accuracy of the order of 0.3° (depending on the sensors). This a priori knowledge is obtained by extrapolation from the preceding measurement. It is also possible to provide it by telemetry. It is this telemetry feature which is made use of below.

In tracking mode, when attitude is known a priori, it is possible to predict the positions of the stars that are being used and thus to read only those pixels which are adjacent thereto.

During a solar eruption, a proton flux is emitted that exceeds normal proton flux by several orders of magnitude. The interaction of such protons with the CCD matrix of a star sensor gives rise to electrons being deposited, and that can be interpreted as a star signal.

When the star sensor is in tracking mode, this phenomenon is not very critical since only a window of small size around each star is used in the processing, thereby minimizing the risk of interaction.

In contrast, when implementing acquisition mode, the entire CCD matrix is processed, and the presence of false stars runs the risk of disturbing or saturating the algorithm for recognizing the pattern of stars present.

There is then a risk of the failure detection isolation and recovery (FDIR) logic of the satellite triggering reconfiguration of the star sensor during a solar eruption, and that might make it impossible to reconfigure a redundant star sensor.

In this context, it is recalled that sensor reconfiguration can be due to two origins:

either the FDIR logic detects malfunction on the nominal sensor (by processing its telemetry), considers it to be broken down, and orders reconfiguration on the redundant equipment;

or else the FDIR logic detects a more general problem (e.g. excessive attitude error) but for which it is not possible to isolate the cause simply, in which case it orders general reconfiguration of all of the equipment in operation at that time, including the star sensor, even if it is functioning properly.

The resulting interruption of the main mission of the satellite will then be of a duration that corresponds to the typical duration of a solar eruption which is 48 hours (h) to 72 h. Such an interruption represents unacceptable lack of security and high extra cost.

OBJECTS AND SUMMARY OF THE INVENTION

The present invention enables this problem to be solved. It makes it possible to avoid interrupting a mission even if the active star sensor stops during an eruption of solar origin protons.

More particularly, the present invention provides a method of providing protection against the effects of solar originating protons, so as to make it possible for a star sensor to be reconfigured, said sensor being suitable for providing attitude data of a satellite, the method comprising the following steps:

detecting the arrival of an eruption of solar origin protons; and triggering tracking mode operation of a second star sensor when the arrival of an eruption of solar origin protons has been detected so as to have at least one sensor in operation throughout the duration of the solar eruption.

According to another characteristic, tracking mode operation of the second sensor is obtained on the basis of attitude data supplied by the first sensor.

Detection comprises the following steps:

recording the number of stars rejected as obtained by processing the telemetry data of the first sensor;

determining a mean value for said number over a determined duration in order to eliminate false alarms;

comparing said mean value with a predetermined threshold; and triggering operation of the second sensor when said threshold is reached or exceeded.

The invention also provides a system for controlling the attitude of a satellite having at least two star sensors onboard the satellite, a first of which is in operation, the system being characterized in that it comprises:

means for detecting the arrival of an eruption of solar origin protons, said means delivering a control signal; and means for triggering operation of the second star sensor in tracking mode based on the attitude data provided by the first star sensor, said means being activated by said control signal.

According to another characteristic, the means for detecting the arrival of an eruption of protons of solar origin comprise means for recording the number of rejected stars as obtained by processing telemetry data from the star sensor in operation.

The means for detecting the arrival of an eruption of solar origin protons includes means for eliminating false alarms. Typically, these means comprise a lowpass filter.

According to anther characteristic, the means for detecting the arrival of an eruption of solar origin protons comprise decision logic having a predetermined maximum threshold beyond which it causes operation of the second star sensor to be triggered.

BRIEF DESCRIPTION OF THE DRAWING

Other features and advantages of the invention appear clearly on reading the following description given by way of non-limiting example with reference to the sole accompanying FIGURE which is a diagram of a system for implementing the method.

MORE DETAILED DESCRIPTION

The system proposed comprises placing at least two star sensors 1 and 2 onboard a satellite. In practice, existing systems provide a redundant star sensor 2 for use in the event of failure of the star sensor 1 that is provided for performing telemetry measurements.

As explained in greater detail below, the redundant star sensor 2 is used to provide protection against a breakdown of the sensor 1 that might arise during a period of solar eruption.

For that purpose, provision is made for the redundant sensor 2 to be put into operation in tracking mode, i.e. locked on stars used for determining the attitude of the satellite as soon as the arrival of a solar eruption is detected.

Thus, during the period of the solar eruption, both pieces of equipment, i.e. the star sensor 1 provided for controlling the attitude of the satellite and the redundant sensor 2 are in tracking mode. As a result, if one of these pieces of equipment should momentarily fail, the other remains in tracking mode and there is no interruption to the mission of the satellite.

Consequently, in the event of star sensor 1 breaking down which would imply reconfiguration, the redundant sensor is already in tracking mode and operational. Were it to be necessary under such conditions to perform configuration in acquisition mode for the redundant sensor, then that configuration would be fruitless because of the saturation caused by the protons of solar origin.

In known manner, a system for controlling the attitude of a satellite in space comprises at least one star sensor 1 and an attitude control computer 3. These pieces of equipment are shown in the diagram of the sole FIGURE.

In order to implement the method in a preferred embodiment, the various operations of detecting and triggering operation of the second sensor 2 are performed by the computer 3 which, for this purpose, includes a unit 30 for processing telemetry data. The computer 3 also has a unit 31 suitable for eliminating false alarms, a logic decision unit 32, and a unit 33 for triggering tracking mode operation of the redundant sensor 2.

In the above implementation, i.e. in the event of a star sensor which is self-contained, having in its own processor all of the functions needed, including an algorithm for determining attitude, the unit 30 for processing telemetry data receives the telemetry data from the sensor 1 in the form of two values: one being the number of stars expected by the telemetry algorithm of the sensor; and the other being the number of stars actually in use for determining attitude.

Telemetry from a self-contained star sensor delivers two values:

the expected number of stars; as a function of attitude and estimated speed, the software "predicts" the number and positions of the stars; and the number of stars actually in use for determining attitude.

The processor unit 30 reads these two values in the delivered stream of telemetry data and it takes the difference to determine the number N of stars that have been rejected. This information is used in accordance with the present invention to detect the arrival of a solar eruption. In the absence of an operating anomaly, the number N is about zero. When the number of stars rejected by the algorithm is greater than N, that means that the algorithm is eliminating more stars from the processing than is normal for a given star sensor. The sensor is thus being disturbed by a physical phenomenon such as the emission of protons of solar origin.

In order to improve measurement, provision is then made at the output from the unit 30 for a unit 31 that serves to establish a mean value for the number of stars that have been eliminated by observing the various values obtained over a fixed duration. This operation makes it possible to eliminate false alarms. For this purpose, it is possible for example to use a sliding average over a duration of 1 hour.

In a preferred implementation, the unit 31 uses a lowpass filter whose time constant corresponds to the duration over which the number of rejected stars is observed.

When the threshold Nmax is reached or exceeded, decision logic 32 activates the unit 33 for triggering the operation of the redundant sensor 2.

This unit 33 receives the star attitude data from the sensor 1 and is capable on the basis of said data of locking the sensor 2 on the reference star. In-practice, the attitude determined by the sensor 1 is transformed into the frame of reference of the sensor 2 by said unit 33.

In practice, the units 30 to 33 are procedures in software designed for this purpose.

The computer and the software run by the computer are onboard the satellite, but it would also be possible for them to be on the ground without that altering the principle of the invention.

In addition, in the example given, the star sensor is self-contained and, as mentioned above, has its own processor including telemetry software, in particular. The processing performed by the unit 30 consists in taking the difference between the two above-mentioned parameters as delivered by that software. Full telemetry processing could naturally be performed by the unit 30 if the sensor were not self-contained, i.e. if it did not have its own telemetry measurement means. That would change nothing to the principle of the invention. Under such circumstances, the processor unit 30 would have information concerning the number of stars rejected directly available to it.

What is claimed is:

1. A method of providing protection against the effects of solar origin protons, so as to make it possible for a star sensor to be reconfigured, said sensor being suitable for supplying attitude data of a satellite in space, the method comprising the following steps:

detecting the arrival of an eruption of solar origin protons; and triggering tracking mode operation of a second star sensor when the arrival of an eruption of solar origin protons has been detected, so as to have available at least one sensor in operation during the solar eruption.

2. A method of providing protection against the effects of solar origin protons according to claim 1, characterized in that tracking mode operation of the second sensor is obtained from attitude data supplied by the first sensor.

3. A method of providing protection against the effects of solar origin protons according to claim 1, characterized in that detection comprises the following steps:

recording the number of stars rejected as obtained by processing the telemetry data of the first sensor;

determining a mean value for said number over a determined duration in order to eliminate false alarms;

comparing said mean value with a predetermined threshold; and triggering operation of the second sensor when said threshold is reached or exceeded.

4. A system for controlling the attitude of a satellite, having at least two star sensors onboard the satellite, a first sensor being in operation, the system being characterized in that it comprises:

means for detecting the arrival of an eruption of solar origin protons, said means delivering a control signal; and means for triggering operation of the second star sensor in tracking mode based on the attitude data provided by the first star sensor, said means being activated by said control signal.

5. A system for controlling the attitude of a satellite according to claim 4, characterized in that the means for detecting the arrival of an eruption of protons of solar origin comprise means for recording the number of rejected stars as obtained by processing telemetry data from the star sensor in operation.

6. A system for controlling the attitude of a satellite according to claim 4, characterized in that the means for detecting the arrival of an eruption of solar origin protons includes means for eliminating false alarms.

7. A system for controlling the attitude of a satellite according to claim 6, characterized in that the means for eliminating false alarms comprise a lowpass filter.

8. A system for controlling the attitude of a satellite according to claim 4, characterized in that the means for detecting the arrival of an eruption of solar origin protons comprise decision logic having a predetermined maximum threshold beyond which it causes operation of the second star sensor to be triggered.

* * * * *